(12) United States Patent
Sindhu et al.

(10) Patent No.: US 10,798,223 B2
(45) Date of Patent: Oct. 6, 2020

(54) RELIABLE COMMUNICATIONS USING A POINT TO POINT PROTOCOL

(71) Applicant: Fungible, Inc., Santa Clara, CA (US)

(72) Inventors: Pradeep Sindhu, Los Altos Hills, CA (US); Deepak Goel, San Jose, CA (US); Srihari Raju Vegesna, San Jose, CA (US); Aibing Zhou, San Jose, CA (US); Shashi Kumar, Fremont, CA (US); Rohit Sunkam Ramanujam, Sunnyvale, CA (US)

(73) Assignee: Fungible, Inc., Santa Clara, CA (US)

(*) Notice: Subject to any disclaimer, the term of this patent is extended or adjusted under 35 U.S.C. 154(b) by 0 days.

(21) Appl. No.: 16/295,902

(22) Filed: Mar. 7, 2019

(65) Prior Publication Data

US 2019/0281142 A1 Sep. 12, 2019

Related U.S. Application Data

(60) Provisional application No. 62/640,487, filed on Mar. 8, 2018.

(51) Int. Cl.
| | |
|---|---|
| H04J 3/14 | (2006.01) |
| H04L 29/06 | (2006.01) |
| H04L 1/16 | (2006.01) |
| H04L 29/08 | (2006.01) |
| H04L 12/801 | (2013.01) |
| H04L 12/933 | (2013.01) |

(52) U.S. Cl.
CPC ............ *H04L 69/08* (2013.01); *H04L 1/1621* (2013.01); *H04L 69/03* (2013.01); *H04L 69/14* (2013.01); *H04L 69/166* (2013.01); *H04L 69/22* (2013.01); *H04L 69/26* (2013.01); *H04L 69/324* (2013.01); *H04L 47/39* (2013.01); *H04L 49/10* (2013.01); *H04L 69/02* (2013.01)

(58) Field of Classification Search
CPC ...................................................... H04L 69/08
See application file for complete search history.

(56) References Cited

U.S. PATENT DOCUMENTS 5,859,837 A * 1/1999 Crayford ................. H04L 12/46
370/230
2015/0117177 A1 4/2015 Ganga et al.
(Continued)

FOREIGN PATENT DOCUMENTS

WO 2009081139 A1 7/2009

OTHER PUBLICATIONS

Second Written Opinion of International Application No. PCT/US2019/021194, dated Jan. 29, 2020, 10 pp.
(Continued)

*Primary Examiner* — Sulaiman Nooristany
(74) *Attorney, Agent, or Firm* — Shumaker & Sieffert, P.A.

(57) ABSTRACT

This disclosure describes techniques for performing communications between devices using various aspects of Ethernet standards. As further described herein, a protocol is disclosed that may be used for communications between devices, where the communications take place over a physical connection complying with Ethernet standards. Such a protocol may enable reliable and in-order delivery of frames between devices, while following Ethernet physical layer rules, Ethernet symbol encoding, Ethernet lane alignment, and/or Ethernet frame formats.

11 Claims, 11 Drawing Sheets

(56) References Cited

U.S. PATENT DOCUMENTS

| | | |
|---|---|---|
| 2017/0272370 A1 | 9/2017 | Ganga et al. |
| 2018/0287965 A1 | 10/2018 | Sindhu et al. |
| 2018/0293168 A1 | 10/2018 | Noureddine et al. |
| 2019/0012278 A1 | 1/2019 | Sindhu et al. |
| 2019/0013965 A1 | 1/2019 | Sindhu et al. |

OTHER PUBLICATIONS

Response to Written Opinion dated Jan. 1, 2020, from international application No. PCT PCT/US2019/021194, filed Mar. 25, 2020, 6 pp.
International Search Report and Written Opinion of International Application No. PCT/US2019/021194, dated Jun. 5, 2019, 17 pp.

* cited by examiner

| Ethernet II Frame Structure and Field Size | | | | | |
|---|---|---|---|---|---|
| 8 Bytes | 6 Bytes | 6 Bytes | 2 Bytes | 46-1500 Bytes | 4 Bytes |
| Preamble | Dest. Address | Source Address | Type | Data | Frame Check Sequence |

(12) United States Patent

RELIABLE COMMUNICATIONS USING A POINT TO POINT PROTOCOL

CROSS REFERENCE

This application claims the benefit of U.S. Provisional Patent Application No. 62/640,487 filed on Mar. 8, 2018, which is hereby incorporated by reference herein in its entirety.

TECHNICAL FIELD

This disclosure relates to communications, and more specifically, to reliable communications between computing devices.

BACKGROUND

In a typical cloud-based data center, a large collection of interconnected servers provides computing and/or storage capacity for execution of various applications. For example, a data center may comprise a facility that hosts applications and services for subscribers, i.e., customers of the data center. The data center may, for example, host all of the infrastructure equipment, such as compute nodes, networking and storage systems, power systems, and environmental control systems. In most data centers, clusters of storage systems and application servers are interconnected via a high-speed switch fabric provided by one or more tiers of physical network switches and routers. Data centers vary greatly in size, with some public data centers containing hundreds of thousands of servers, and may be distributed across multiple geographies for redundancy.

Such networks include devices that may be physically close to each other, such as a collection of servers and/or other devices located within a data center or within a data center rack, and that may have a need to communicate with each other directly, without communicating over the fabric. A number of techniques have been used for such communications, including those using device-to-device communications employing the Peripheral Component Interconnect Express (PCIe) standard. While PCIe has been and may continue to be used for device-to-device communications, PCIe was developed as a high-speed serial computer expansion bus standard for communications over very short distances between devices on the same circuit board. Although it is possible for PCIe to be used for communications between devices not on the same circuit board, such an arrangement is not always optimal. The communications speeds in such an arrangement might not be sufficiently high, and further, the cost and/or availability of the hardware required to implement such a solution can also be a limitation.

SUMMARY

This disclosure describes techniques for performing communications between devices using, for example, layer two (L2) data link layer communications. The communications may, for example, conform to various aspects of Ethernet standards yet provide increased reliability and data throughput. As further described herein, a protocol is disclosed that may be used for reliable communications between devices, where the communications take place over a physical connection complying with Ethernet standards, thereby being interoperable with other devices and networking components, such as hardware interfaces and links, that support Ethernet-based communications. In some examples, such communications may avoid some characteristics that might otherwise accompany Ethernet communications, such as latency resulting from forward error correction and associated buffering, and other complications. As further disclosed herein, such a protocol may enable reliable, efficient, and in-order delivery of frames between devices, while following Ethernet physical layer rules, Ethernet symbol encoding, Ethernet lane alignment, and/or Ethernet frame formats.

In some examples, one or more of the protocols disclosed herein, referenced individually and/or collectively herein as the "reliable frame transfer protocol," or "RFT" protocol, may use Ethernet physical and electrical standards, as well as aspects of the structure of a standard Ethernet frame to implement various features associated with the protocol. For example, the RFT protocol may use a portion of the Ethernet frame to identify a frame as one that should be interpreted as an RFT protocol frame, rather than a standard Ethernet frame. Further, for frames used pursuant to the reliable frame transfer protocol, additional information and/or control information for the RFT protocol may be carried in the Ethernet frame at locations or within fields of the Ethernet frame that might otherwise be normally devoted to other purposes in Ethernet communications.

Techniques in accordance with one or more aspects of the present disclosure may provide certain advantages, including enabling reliable, in-order, and high-speed delivery of frames over physical connections that employ widely-available and inexpensive hardware. Further, such techniques may employ an acknowledgment and credit flow control protocol that enables efficient and high-speed device to device communications of variable-sized messages. Still further, such techniques may enable conventional Ethernet frames to coexist over the same physical connection with communications involving RFT protocol frames, and allow devices to allocate bandwidth between Ethernet frames and RFT protocol frames over multiple virtual channels.

BRIEF DESCRIPTION OF THE DRAWINGS

FIG. 4A is a conceptual diagram illustrating an Ethernet II frame structure and field size, in accordance with one or more aspects of the present disclosure.

DETAILED DESCRIPTION

Figure 1:
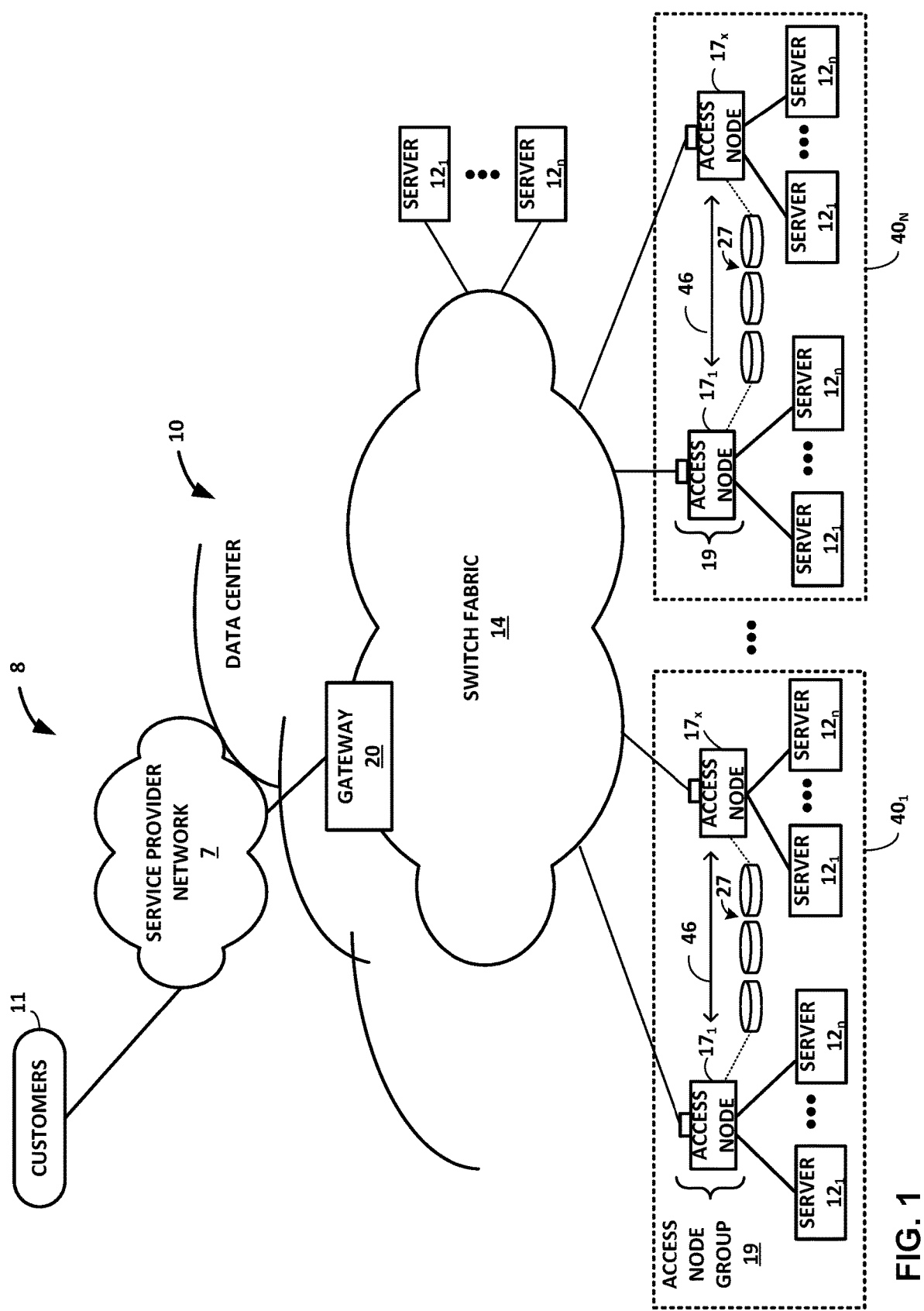
FIG. 1 is a block diagram illustrating an example system including one or more network devices configured to efficiently process a series of work units in a multiple core processor system.

FIG. 1 is a block diagram illustrating an example system 8 including one or more network devices configured to efficiently process a series of work units in a multiple core processor system. As described herein, techniques for performing reliable point to point communications between devices (e.g., between access nodes 17 and host networking units included within server devices 12 and/or storage devices 27) may provide technical benefits that include enabling high-speed, in-order, and efficient communications between devices without at least some of the limitations of existing techniques for such communications. Access nodes may also be referred to as data processing units (DPUs), or devices including DPUs, in this disclosure. In the example of FIG. 1, various data structures and processing techniques are described with respect to access nodes 17 within a data center 10. Other devices within a network, such as routers, switches, servers, firewalls, gateways and the like, having multiple core processor systems may readily be configured to utilize the data processing techniques described herein.

Data center 10 represents an example of a system in which various techniques described herein may be implemented. In general, data center 10 provides an operating environment for applications and services for customers 11 coupled to the data center by service provider network 7 and gateway device 20. Data center 10 may, for example, host infrastructure equipment, such as compute nodes, networking and storage systems, redundant power supplies, and environmental controls. Service provider network 7 may be coupled to one or more networks administered by other providers, and may thus form part of a large-scale public network infrastructure, e.g., the Internet.

In some examples, data center 10 may represent one of many geographically distributed network data centers. In the example of FIG. 1, data center 10 is a facility that provides information services for customers 11. Customers 11 may be collective entities such as enterprises and governments or individuals. For example, a network data center may host web services for several enterprises and end users. Other exemplary services may include data storage, virtual private networks, file storage services, data mining services, scientific- or super-computing services, and so on.

In the illustrated example, data center 10 includes a set of storage systems and application servers 12 interconnected via a high-speed switch fabric 14. In some examples, servers 12 are arranged into multiple different server groups, each including any number of servers up to, for example, n servers $12_1$-$12N$. Servers 12 provide computation and storage facilities for applications and data associated with customers 11 and may be physical (bare-metal) servers, virtual machines running on physical servers, virtualized containers running on physical servers, or combinations thereof.

In the example of FIG. 1, each of servers 12 is coupled to switch fabric 14 by an access node 17 for processing streams of information, such as network packets or storage packets. In example implementations, access nodes 17 may be configurable to operate in a standalone network appliance having one or more access nodes. For example, access nodes 17 may be arranged into multiple different access node groups 19, each including any number of access nodes up to, for example, x access nodes $17_1$-$17X$. In other examples, each access node may be implemented as a component (e.g., electronic chip) within a device, such as a compute node, application server, storage server, and may be deployed on a motherboard of the device or within a removable card, such as a storage and/or network interface card.

In general, each access node group 19 may be configured to operate as a high-performance I/O hub designed to aggregate and process network and/or storage I/O for multiple servers 12. As described above, the set of access nodes 17 within each of the access node groups 19 provide highly-programmable, specialized I/O processing circuits for handling networking and communications operations on behalf of servers 12. In addition, in some examples, each of access node groups 19 may include storage devices 27, such as solid state drives (SSDs) and/or hard disk drives (HDDs), configured to provide network accessible storage for use by applications executing on the servers 12. In some examples, one or more of the SSDs may comprise non-volatile memory (NVM) or flash memory.

Each access node group 19, including its set of access nodes 17 and storage devices 27, and the set of servers 12 supported by the access nodes 17 of that access node group 19 may be referred to herein as a network storage compute unit (NCSU) 40. Illustrated in FIG. 1 are NCSU 40-1 through NCSU 40-N, which represent any number of NCSUs. In some examples, data center 10 may include many NCSUs, and multiple NCSUs 40 may be organized into logical racks or physical racks within data center 10. For example, in some implementations, two NCSUs may compose a logical rack, and four NCSUs may compose a physical rack. Other arrangements are possible.

As further described herein, in one example, each access node 17 is a highly programmable I/O processor specially designed for offloading certain functions from servers 12. In one example, each access node 17 includes a number of internal processor clusters, each including two or more processing cores and equipped with hardware engines that offload cryptographic functions, compression and regular expression (RegEx) processing, data durability functions, data storage functions and networking operations. In this way, each access node 17 includes components for fully implementing and processing network and storage stacks on behalf of one or more servers 12. In addition, access nodes 17 may be programmatically configured to serve as a security gateway for its respective servers 12, freeing up the processors of the servers to dedicate resources to application workloads. In some example implementations, each access node 17 may be viewed as a network interface subsystem that implements full offload of the handling of data packets (with, in some examples, zero copy in server memory) and storage acceleration for the attached server systems. In one example, each access node 17 may be implemented as one or more application-specific integrated circuit (ASIC) or other hardware and software components, each supporting a subset of the servers.

In the example of FIG. 1, each access node 17 provides connectivity to switch fabric 14 for a different group of servers 12 and may be assigned respective IP addresses and provide routing operations for the servers 12 coupled thereto. Access nodes 17 may interface with and utilize switch fabric 14 so as to provide full mesh (any-to-any) interconnectivity such that any of servers 12 may communicate packet data for a given packet flow to any other of the servers using any of a number of parallel data paths within the data center 10. In addition, access nodes 17 described herein may provide additional services, such as storage (e.g., integration of solid-state storage devices), security (e.g., encryption), acceleration (e.g., compression), data reliability (e.g., erasure coding), I/O offloading, and the like. In some examples, one or more of access nodes 17 may include storage devices, such as high-speed solid-state drives or rotating hard drives, configured to provide network accessible storage for use by applications executing on the servers. More details on the data center network architecture and interconnected access nodes illustrated in FIG. 1 are available in U.S. Provisional Patent Application No. 62/514,583, filed Jun. 2, 2017, entitled "Non-Blocking Any-to-Any Data Center Network with Packet Spraying Over Multiple Alternate Data Paths," (Attorney Docket No. 1242-002USP1), U.S. Provisional Patent Application No. 62/483,844, filed Apr. 10, 2017, entitled "Relay Consistent Memory Management in a Multiple Processor System," U.S. Provisional Patent Application No. 62/530,691, filed Jul. 10, 2017, entitled "Data Processing Unit for Computing Devices," and U.S. Provisional Patent Application No. 62/559,021, filed Sep. 15, 2017, entitled "Access Node for Data Centers," the entire content of each of which is incorporated herein by reference.

In the example of FIG. 1, and in accordance with one or more aspects of the present disclosure, access nodes 17 may communicate with other access nodes of the same access node group 19 and/or with one or more devices included within servers 12 and storage devices 27 using a reliable frame transfer protocol (RFT), as further described herein. For instance, in the example of FIG. 1, one or more of access nodes 17 may be physically close to one or more of servers 12, storage devices 27 and/or other access nodes 17 of the same access node group or even an access node that is multiple hops away. In some examples, access nodes 17 and servers 12 may be included within the same physical rack, and may be connected by a physical and electrical connection complying with Ethernet physical and electrical standards. As one example, to communicate, one of access nodes 17 (e.g., access node 17-1) may identify information to be communicated to a server 12 (e.g., server 12-1) or to a storage device 27. Access node 17-1 constructs and outputs one or more layer two frames including the information. As described herein, each frame has attributes consistent with the Ethernet standard (e.g., it has a size consistent with Ethernet standards, and has an Ethernet frame check sequence) so as that communication of the frame by other device may conform to L2 data link layer forwarding of Ethernet frames, but not all aspects of the format of the frame are consistent with a standard Ethernet frame so as to achieve increased reliability, throughput and other technical advantages. Moreover, access nodes 17 may communicate the enhanced frames along with other standard Ethernet frames over the same interface and link, e.g., in an interleaved manner.

Access node 17-1 outputs the frame over the Ethernet connection to server 12-1 by complying with all physical and electrical requirements of the Ethernet standard. A host networking unit (not shown in FIG. 1) included within server 12-1 receives the frame over the connection, and determines, based on information stored at a particular location within the frame, that the frame is an RFT frame, rather than an Ethernet frame. The host networking unit within server 12-1 interprets the frame as an RFT frame, extracts the information from the frame, and outputs the information (or data derived from the information) to server 12-1. In some examples the information is outputted to server 12-1 over an on-board PCIe connection. Server 12-1 processes the information received from the host networking unit accordingly. Server 12-1 communicates with the host networking unit (e.g., over the on-board PCIe connection), and causes the host networking unit to send a responsive message back to access node 17-1, over the Ethernet connection, acknowledging receipt of the frame. If access node 17-1 does not receive an acknowledgment, access node 17-1 may continue to retransmit the frame over the Ethernet connection to server 12-1 until acknowledgment is received by the access node 17-1, thereby helping to ensure reliable communications.

Accordingly, access node 17-1 and server 12-1, where server 12-1 is configured with a host network unit as described herein, may communicate in the example of FIG. 1 over an Ethernet physical layer connection using frames that have attributes of the Ethernet standard, but such communications are used for reliable point-to-point communications between devices, rather than for communications over an Ethernet network. In some examples, the host network unit configured within one or more of servers 12 and storage devices 27 may comprise all or portions of the functionality described herein with respect to access nodes 17. In other examples, the host network unit configured within one or more of servers 12 and storage devices 27 may be a programmable network interface card (NIC) configured to implement the RFT protocol described herein. The techniques described herein may provide several technical advantages. For instance, by using a point-to-point protocol using an acknowledgement handshake with retransmit, rather than a forward error correction reliability scheme, buffering that might normally accompany an error correction scheme may be avoided. For short point-to-point connections of the type described herein, some forward error correction schemes may be excessive, and may result in unnecessary latency.

Figure 2A:
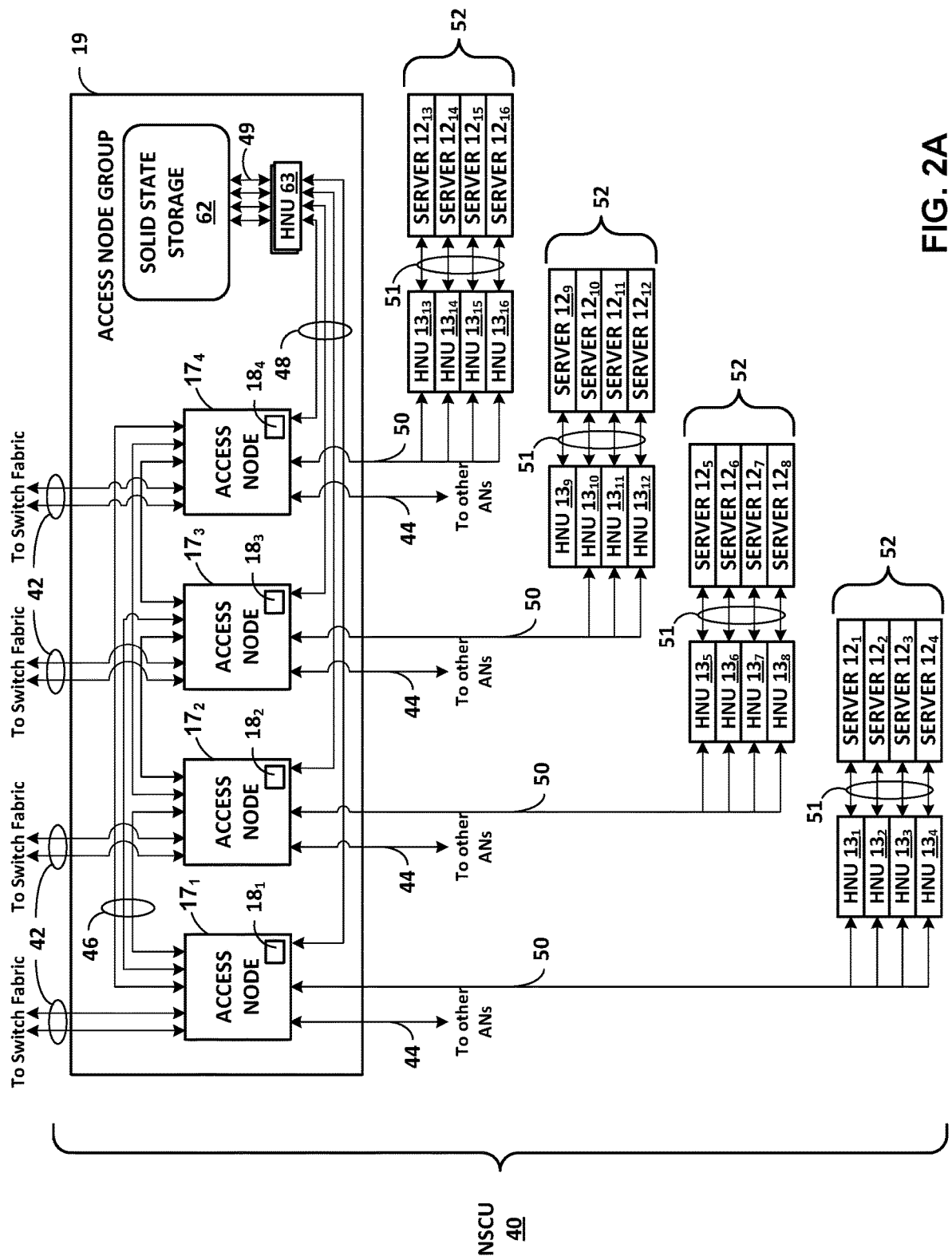
FIG. 2A is a block diagram illustrating one example of network storage compute unit (NSCU) including an access node group and its supported servers, in accordance with one or more aspects of the present disclosure.

FIG. 2A is a block diagram illustrating one example of network storage compute unit (NSCU) 40 including an access node group 19 and its supported servers 52. Access node group 19 may be configured to operate as a high-performance I/O hub designed to aggregate and process network and storage I/O to multiple servers 52. In the particular example of FIG. 2A, access node group 19 includes four access nodes $17_1$-$17_4$ (collectively, "access nodes 17") connected to a pool of local solid state storage 62 through one or more host networking units 63. In the illustrated example, access node group 19 supports a total of sixteen server nodes $12_1$-$12_{16}$ (collectively, "server nodes 12") with each of the four access nodes 17 within access node group 19 supporting four of server nodes 12, and connected to such server nodes through host networking units 13. In some examples, each of the four server nodes 12 supported by each of the access nodes 17 may be arranged as a server 52. In some examples, the "servers 12" described throughout this application may be dual-socket or dual-processor "server nodes" that are arranged in groups of two or more within a standalone server device, e.g., servers 52.

Although access node group 19 is illustrated in FIG. 2A as including four access nodes 17 that are all connected to a single pool of solid state storage 62, an access node group may be arranged in other ways. In one example, each of the four access nodes 17 may be included on an individual access node sled that also includes solid state storage and/or other types of storage for the access node. In this example, an access node group may include four access node sleds each having an access node and a set of local storage devices.

Access nodes 17 may connect to other access nodes and the datacenter switch fabric 14 using Ethernet links 42, 44, 46. For example, each of access nodes 17 may support six or more high-speed Ethernet connections, including two externally-available Ethernet connections 42 for communicating with the switch fabric, one externally-available Ethernet connection 44 for communicating with other access nodes in other access node groups, and three internal Ethernet connections 46 for communicating with other access nodes 17 in the same access node group 19. In one example, each of externally-available connections 42 may be a 100 Gigabit Ethernet (GE) connection. In this example, access node group 19 has 8X100 GE externally-available ports to connect to the switch fabric 14.

Within access node group 19, connections 42 may be copper, i.e., electrical, links arranged as 8X25 GE links between each of access nodes 17 and optical ports of access node group 19. Between access node group 19 and the switch fabric, connections 42 may be optical Ethernet connections coupled to the optical ports of access node group 19. The optical Ethernet connections may connect to one or more optical devices within the switch fabric, e.g., optical permutation devices described in more detail below. The optical Ethernet connections may support more bandwidth than electrical connections without increasing the number of cables in the switch fabric. For example, each optical cable coupled to access node group 19 may carry 4X100 GE optical fibers with each fiber carrying optical signals at four different wavelengths or lambdas. In other examples, the externally-available connections 42 may remain as electrical Ethernet connections to the switch fabric.

The four remaining Ethernet connections supported by each of access nodes 17 include one Ethernet connection 44 for communication with other access nodes within other access node groups, and three Ethernet connections 46 for communication with the other three access nodes within the same access node group 19. In some examples, connections 44 may be referred to as "inter-access node group links" and connections 46 may be referred to as "intra-access node group links."

Ethernet connections 44, 46 provide full-mesh connectivity between access nodes within a given structural unit. In one example, such a structural unit may be referred to herein as a logical rack (e.g., a half-rack or a half physical rack) that includes two NSCUs 40 having two ANGs 19 and supports an 8-way mesh of eight access nodes 17 for those ANGs. In this particular example, connections 46 would provide full-mesh connectivity between the four access nodes 17 within the same access node group 19, and connections 44 would provide full-mesh connectivity between each of access nodes 17 and four other access nodes within one other access node group of the logical rack (i.e., structural unit). In addition, access node group 19 may have enough, e.g., sixteen, externally-available Ethernet ports to connect to the four access nodes in the other access node group.

In the case of an 8-way mesh of access nodes, i.e., a logical rack of two NSCUs 40, each of access nodes 17 may be connected to each of the other seven access nodes by a 50 GE connection. For example, each of connections 46 between the four access nodes 17 within the same access node group 19 may be a 50 GE connection arranged as 2X25 GE links. Each of connections 44 between the four access nodes 17 and the four access nodes in the other access node group may include four 50 GE links. In some examples, each of the four 50 GE links may be arranged as 2X25 GE links such that each of connections 44 includes 8X25 GE links to the other access nodes in the other access node group. This example is described in more detail below with respect to FIG. 5.

In another example, Ethernet connections 44, 46 provide full-mesh connectivity between access nodes within a given structural unit that is a full-rack or a full physical rack that includes four NSCUs 40 having four AGNs 19 and supports a 16-way mesh of access nodes 17 for those AGNs. In this example, connections 46 provide full-mesh connectivity between the four access nodes 17 within the same access node group 19, and connections 44 provide full-mesh connectivity between each of access nodes 17 and twelve other access nodes within three other access node group. In addition, access node group 19 may have enough, e.g., forty-eight, externally-available Ethernet ports to connect to the four access nodes in the other access node group.

In the case of a 16-way mesh of access nodes, each of access nodes 17 may be connected to each of the other fifteen access nodes by a 25 GE connection, for example. In other words, in this example, each of connections 46 between the four access nodes 17 within the same access node group 19 may be a single 25 GE link. Each of connections 44 between the four access nodes 17 and the twelve other access nodes in the three other access node groups may include 12X25 GE links.

As shown in FIG. 2A, each of access nodes 17 within an access node group 19 may also support a set of high-speed connections 48, 50 (e.g., Ethernet physical connections) for communication with solid state storage 62 within access node group 19 and communication with servers 52 within NSCU 40. Each of servers 52 includes four server nodes 12 supported by one of access nodes 17 within access node group 19. Solid state storage 62 may be a pool of Non-Volatile Memory express (NVMe)-based solid state drive (SSD) storage devices accessible by each of access nodes 17 via connections 48 through host networking units 63.

In one example, solid state storage 62 may include twenty-four SSD devices with six SSD devices for each of access nodes 17. The twenty-four SSD devices may be arranged in four rows of six SSD devices with each row of SSD devices being connected to one of access nodes 17. Each of the SSD devices may provide up to 16 Terabytes (TB) of storage for a total of 384 TB per access node group 19. As described in more detail below, in some cases, a physical rack may include four access node groups 19 and their supported servers 52. In that case, a typical physical rack may support approximately 1.5 Petabytes (PB) of local solid state storage. In another example, solid state storage 62 may include up to 32 U.2X4 SSD devices. In other examples, NSCU 40 may support other SSD devices, e.g., 2.5″ Serial ATA (SATA) SSDs, mini-SATA (mSATA) SSDs, M.2 SSDs, and the like.

In the above described example in which each of the access nodes 17 is included on an individual access node sled with local storage for the access node, each of the access node sleds may include four SSD devices and some additional storage that may be hard drive or solid state drive devices. In this example, the four SSD devices and the additional storage may provide approximately the same amount of storage per access node as the six SSD devices described in the previous example.

Included within each of access nodes 17 is one or more host networking units 18. In the example of FIG. 2A, each of host networking units 18 is used to communicate with other host networking units 18 within other access nodes 17 over an Ethernet physical connection (e.g., connections 46). Such communications may be standard Ethernet communications or may be RFT communications, as further described herein, over the same Ethernet physical connection.

Each of host networking units 18 may also be used to communicate with other devices. Specifically, in the example illustrated in FIG. 2A, host networking units 18 within access nodes 17 connect to servers 12 and solid state storage 62 through host networking units 13 and host networking units 63, respectively, using Ethernet physical connections 50 and 48. Each of host networking units 13 and host networking units 63 are configured to perform either standard Ethernet communications or RFT protocol communications over an Ethernet physical connection, or both. Communications pursuant to the RFT protocol between host networking units 18 and host networking units 13, for example, enable reliable and efficient point-to-point frame transfer between access nodes 17 and server 12 that may have advantages over existing methods of communication (e.g., PCIe) between such devices. Similarly, communications between host networking units 18 and host networking units 63 may enable reliable and efficient point-to-point communications between nodes 17 and storage devices 62 that may have advantages over existing methods.

In FIG. 2A, communications between host networking units 13 and servers 12, and communications between host networking units 63 and storage device 62 may still be conducted using existing protocols and methods for communication, such as pursuant to PCIe protocols. However, some or all of the disadvantages that arise from such prior communication methods (and that are addressed through the RFT protocol), might not exist in the context or physical environment of communications between host networking units 13 and servers 12 or between host networking units 63 and storage device 62. Accordingly, such prior protocols and methods may serve as an effective means for communication in the context in which they are used in FIG. 2A.

In the example of FIG. 2A, and in accordance with one or more aspects of the present disclosure, access node 17-1 may communicate with server 12-1 through host networking unit 13-1. For instance, in the example of FIG. 2A, access node 17-1 identifies information to communicate to server 12-1. Access node 17-1 causes host networking unit 18-1 to generate a frame including the information. Host networking unit 18-1 outputs the frame over Ethernet physical connection 50 connecting access node 17-1 and host networking unit 13-1 by complying with all physical and electrical requirements of the Ethernet standard. However, not all aspects of the format of the data included within the frame sent by host networking unit 18-1 to host networking unit 13-1 is consistent with a standard Ethernet frame. Host networking unit 13-1 receives the frame over Ethernet physical connection 50. Host networking unit 13-1 analyzes the frame and determines, based on information within the frame (e.g., based on information stored where the EtherType field would normally be positioned in a standard Ethernet frame), that the frame is a valid RFT frame, rather than an Ethernet frame. Host networking unit 13-1 interprets the frame accordingly, and extracts the information from the frame. Host networking unit 13-1 outputs over PCIe link 51 to server 12-1, a PCIe message that includes the information or data derived from the information. Server 12-1 receives the PCIe message, interprets the message as a PCIe message, and processes the message accordingly.

Host networking unit 13-1 may acknowledge the frame received from access node 17-1. For instance, referring again to FIG. 2A, when host networking unit 13-1 receives the frame over Ethernet physical connection 50 and determines that the frame is a valid RFT frame, host networking unit 13-1 identifies a sequence number embedded within the frame. Host networking unit 13-1 generates a responsive frame including an acknowledgement message identifying the sequence number. Host networking unit 13-1 outputs, over Ethernet physical connection 50 to access node 17-1, the responsive frame. Host networking unit 18-1 within access node 17-1 receives the responsive frame over Ethernet physical connection 50. Host networking unit 18-1 analyzes the responsive frame and determines, based on information within the frame, that the frame is an RFT frame, rather than an Ethernet frame. Host networking unit 18-1 interprets the responsive frame and further determines that the responsive frame includes an acknowledgment of the original frame host networking unit 18-1 sent to host networking unit 13-1. Host networking unit 18-1 concludes that the original frame was received by host networking unit 13-1.

Host networking unit 13-1 may retransmit the frame if no acknowledgment is received. For instance, still referring to FIG. 2A, host networking unit 13-1 might not send an acknowledgement message over Ethernet physical connection 50 to access node 17-1. For example, if host networking unit 13-1 does not receive the original frame, or if it receives the frame and determines that the frame includes errors (e.g., a frame check sequence within the frame indicates that the frame includes errors), host networking unit 13-1 will not send an acknowledgement. Further, host networking unit 13-1 will not send an acknowledgement if host networking unit 13-1 determines that the original frame is an Ethernet frame, rather than an RFT frame. In such an example, host networking unit 18-1 within access node 17-1 will, after a timeout period expires, retransmit the original RFT frame over Ethernet physical connection 50, and may continue to attempt retransmit the frame until an acknowledgement is received.

Similarly, access node 17-1 may communicate with storage device 62 through host networking unit 63. For instance, referring again to FIG. 2A, access node 17-1 identifies data to store at storage device 62. Access node 17-1 causes host networking unit 18-1 to generate a frame including the data. Host networking unit 18-1 outputs the frame over Ethernet physical connection 48 connecting access node 17-1 and host networking unit 63 by complying with all physical and electrical requirements of the Ethernet standard. Host networking unit 63 receives the frame over Ethernet physical connection 48. Host networking unit 63 analyzes the frame and determines, based on information within the frame, that the frame is a valid RFT frame, rather than an Ethernet frame. Host networking unit 63 interprets the frame accordingly, and extracts the data from the frame. Host networking unit 63 outputs over PCIe link 49 to storage device 62, in the form of a PCIe message, the data to be stored at storage device 62. Storage device 62 receives the PCIe message, interprets the message as a PCIe message, and stores the data included in the message.

In a similar manner, access node 17-1 may communicate with other access nodes 17 through RFT protocol. For instance, referring once again to FIG. 2A, access node 17-1 identifies data to communicate to access node 17-2. Access node 17-1 causes host networking unit 18-1 to generate a frame including the data, and host networking unit 18-1 outputs the frame over Ethernet link 46 connecting access node 17-1 and access node 17-2. Access node 17-2 receives the frame, host networking unit 18-2 within access node 17-2 analyzes the frame and determines, based on information within the frame, that the frame is a valid RFT frame. Access node 17-2 interprets the frame accordingly.

Figure 2B:
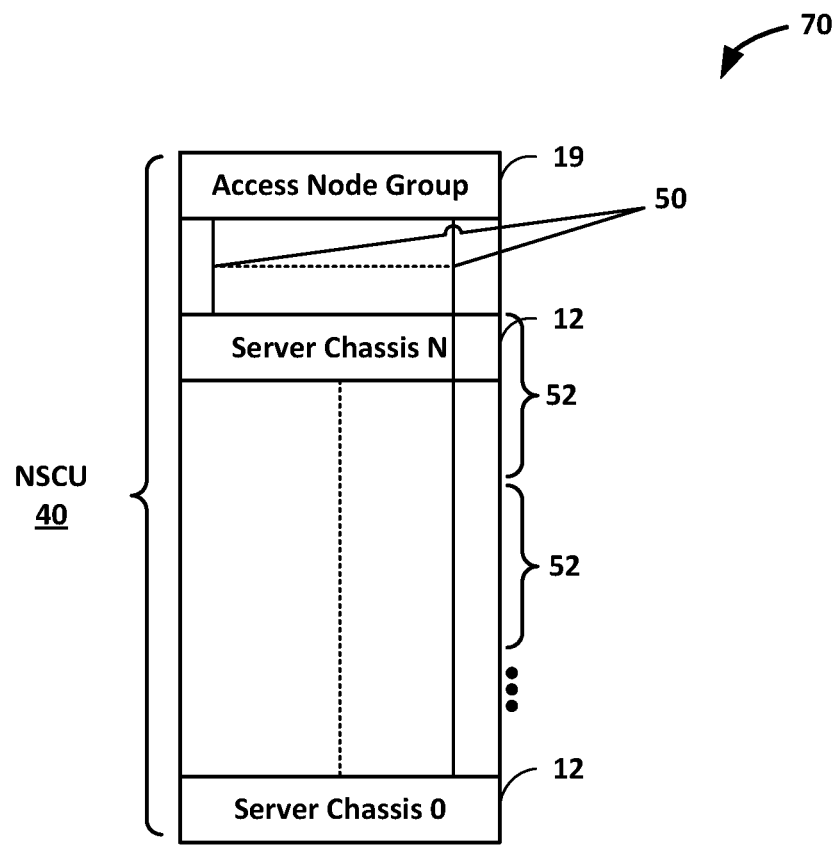
FIG. 2B is a conceptual diagram illustrating a simplified version of FIG. 2A, illustrating an example rack comprising one or more network storage compute units, in accordance with one or more aspects of the present disclosure.

FIG. 2B is a conceptual diagram illustrating a simplified version of FIG. 2A, illustrating an example rack comprising one or more network storage compute units, in accordance with one or more aspects of the present disclosure. In FIG. 2B, rack 70 may include one or more network storage compute units 40. Each of network storage compute units 40 include one or more access node groups 19 and a plurality of server groups 52. Each of server groups 52 may include a plurality of servers 12.

In the example of FIG. 2B, as in FIG. 2A, each of access nodes 17 within access node group 19 are connected to each of servers 12 by one or more Ethernet physical connections 50. As described above in connection with FIG. 2A, each of access nodes 17 within access node group 19 may communicate, pursuant to the RFT protocol, over each of Ethernet physical connections 50. In such examples, each of server 12 may include one or more host networking units 13 (not shown in FIG. 2B) enabling each of servers 12 to interpret RFT frames received from access nodes 17 from within access node group 19.

Figure 3:
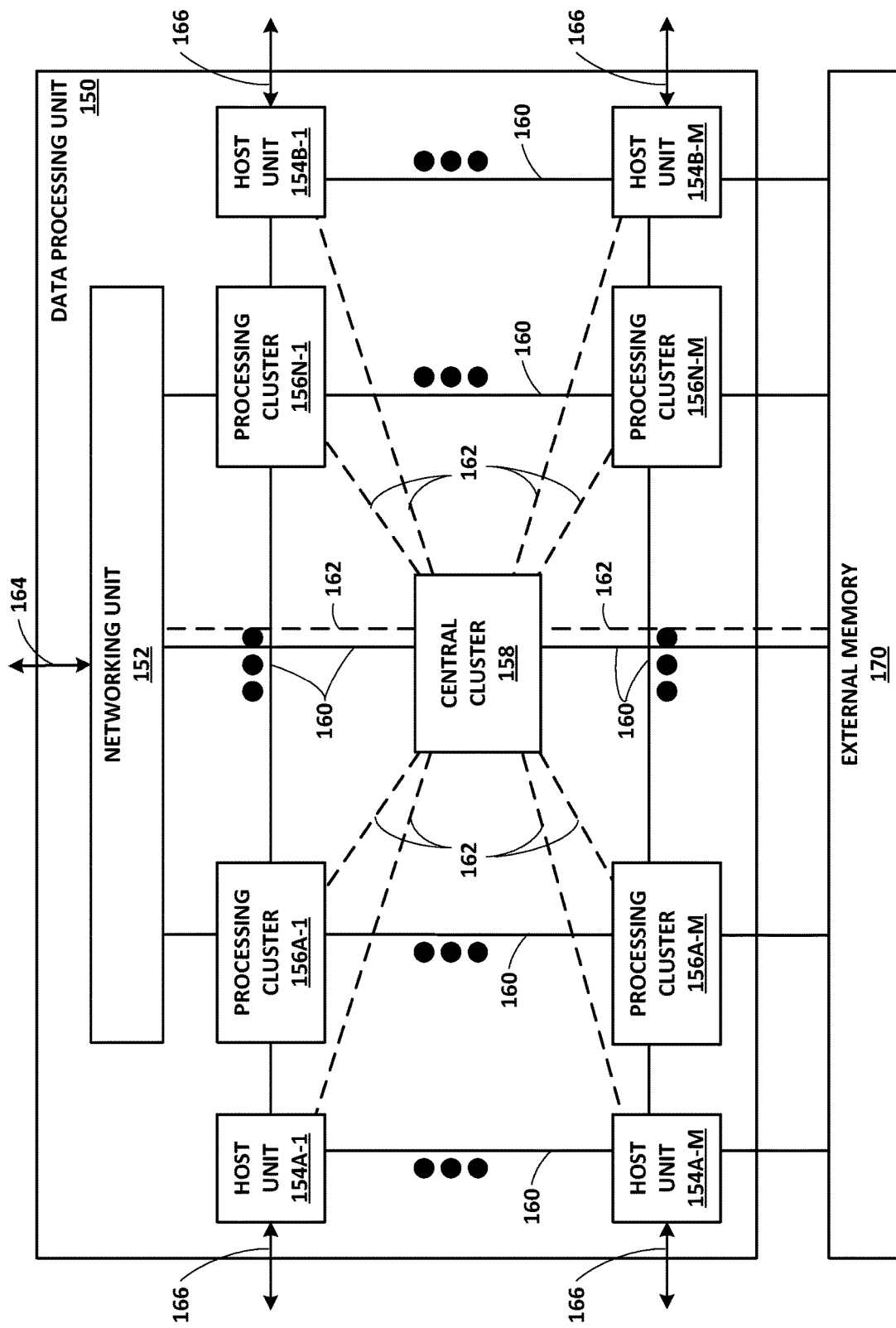
FIG. 3 is a block diagram illustrating an example DPU including two or more processing clusters, in accordance with the techniques of this disclosure.

FIG. 3 is a block diagram illustrating an example data processing unit (DPU) 150 including two or more processing clusters, in accordance with the techniques of this disclosure. DPU 150 may correspond to each of access nodes 17 of FIG. 1, and may operate substantially similar to any of the access nodes 17 as described in connection with FIG. 1, FIG. 2A, and FIG. 2B. Thus, DPU 150 may be communicatively coupled to a data center fabric (e.g., switch fabric 14), one or more server devices (e.g., servers 12), storage media (e.g., SSDs), one or more network devices, random access memory, or the like, e.g., via Ethernet (wired or wireless), or other such communication media in order to interconnect each of these various elements. DPU 150 generally represents a hardware chip implemented in digital logic circuitry. As various examples, DPU 150 may be provided as an integrated circuit mounted on a motherboard of a computing, networking and/or storage device or installed on a card connected to the motherboard of the device.

In general, DPU 150 represents a high performance, hyper-converged network, storage, and data processor and input/output hub. As illustrated in FIG. 3, DPU 150 includes networking unit 152, processing clusters 156A-1 to 156N-M (processing clusters 156), host units 154A-1 to 154B-M (host units 154), and central cluster 158, and is coupled to external memory 170. Each of host units 154, processing clusters 156, central cluster 158, and networking unit 152 may include a plurality of processing cores, e.g., MIPS cores, ARM cores, PowerPC cores, RISC-V cores, or CISC or x86 cores. External memory 170 may comprise random access memory (RAM) or dynamic random access memory (DRAM).

As shown in FIG. 3, host units 154, processing clusters 156, central cluster 158, networking unit 152, and external memory 170 are communicatively interconnected via one or more specialized network-on-chip fabrics. A set of direct links 162 (represented as dashed lines in FIG. 3) forms a signaling network fabric that directly connects central cluster 158 to each of the other components of DPU 150, that is, host units 154, processing clusters 156, networking unit 152, and external memory 170. A set of grid links 160 (represented as solid lines in FIG. 3) forms a data network fabric that connects neighboring components (including host units 154, processing clusters 156, networking unit 152, and external memory 170) to each other in a two-dimensional grid.

Networking unit 152 has Ethernet interfaces 164 to connect to the switch fabric, and interfaces to the data network formed by grid links 160 and the signaling network formed by direct links 162. Networking unit 152 provides a Layer 3 (i.e., OSI networking model Layer 3) switch forwarding path, as well as network interface card (NIC) assistance. One or more hardware direct memory access (DMA) engine instances (not shown) may be attached to the data network ports of networking unit 152, which are coupled to respective grid links 160. The DMA engines of networking unit 152 are configured to fetch packet data for transmission. The packet data may be in on-chip or off-chip buffer memory (e.g., within buffer memory of one of processing clusters 156 or external memory 170), or in host memory.

One or more host units 154 within DPU 150 (e.g., host unit 154A-1, host unit 154A-M, host unit 154B-1, host unit 154B-2) may correspond to host networking units 18 of access nodes 17 illustrated in FIG. 2A. Accordingly, one or more of host units 154 may communicate with one or more servers 12 through host networking units 13 or one or more storage devices 62 through host networking units 63 in the manner described in connection with FIG. 2A. In some examples, DPU 150 may communicate with one or more other DPUs 150 (or access nodes 17) through host units 154. When connected to one or more servers 12 or one or more storage devices 62, DPU 150 may operate as an endpoint or as a root. For example, DPU 150 may connect to a host system (e.g., a server) as an endpoint device, and DPU 150 may connect as a root to endpoint devices (e.g., SSD devices). Each of host units 154 may also include a respective hardware DMA engine (not shown). Each DMA engine is configured to fetch data and buffer descriptors from host memory, and to deliver data and completions to host memory.

FIG. 4A is a conceptual diagram illustrating an Ethernet II frame structure and field size. In some examples, as described herein, control information used to implement RFT may be stored within one or more of the fields in a standard Ethernet frame. In a point to point protocol, for example, there is little need to specify the destination or source address, as such fields are not used to forward or route the frame. However, the two-byte type field, which immediately follows the destination and source address fields, may be used or overloaded to identify a non-Ethernet frame, such as an RFT frame. If used in such a way, the standard Ethernet frame may be used to both carry conventional Ethernet frames as well as non-Ethernet frames, such as those described herein relating to the RFT protocol.

Figure 4B:
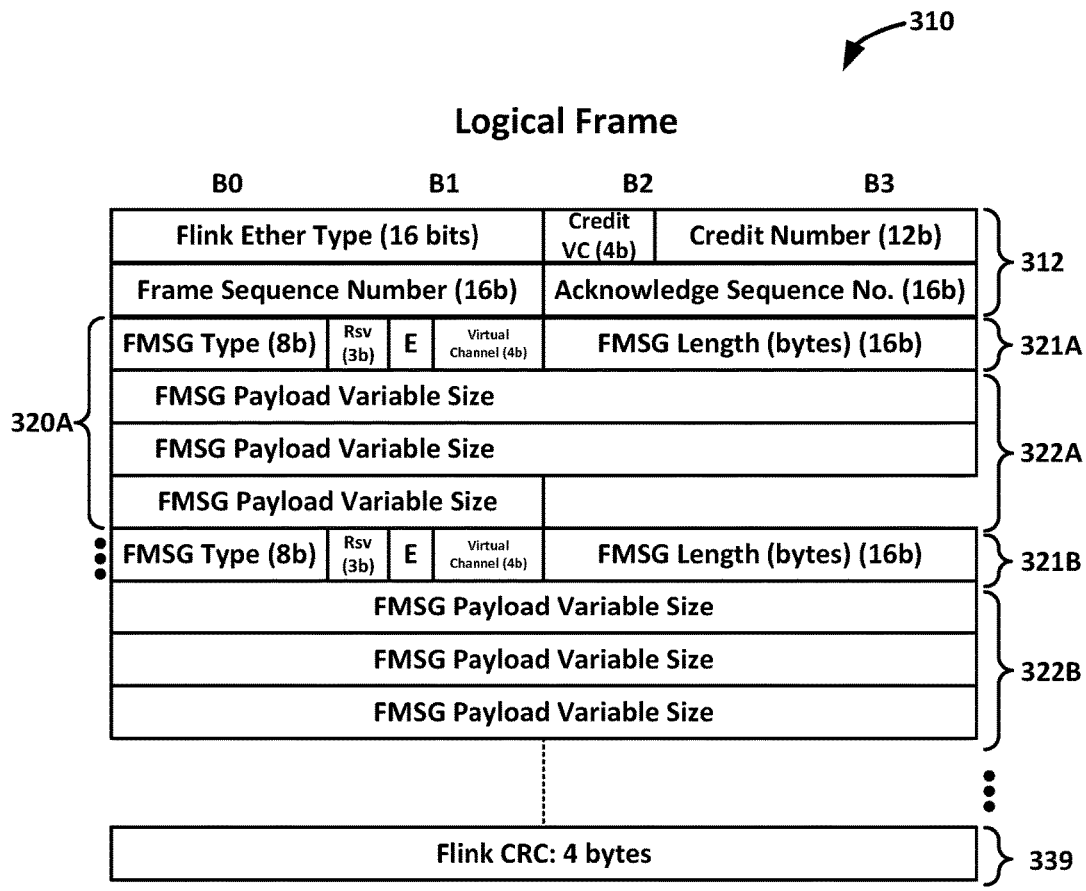
FIG. 4B is a conceptual diagram illustrating an example logical RFT frame, in accordance with one or more aspects of the present disclosure.

FIG. 4B is a conceptual diagram illustrating an example logical RFT frame, in accordance with one or more aspects of the present disclosure. The example of FIG. 4B illustrates how information may be logically arranged within a frame according to the RFT protocol. For instance, the first eight bytes (first two rows in the illustration shown in FIG. 4B) may be dedicated to a frame header 312, a variable number of bytes may be used for one or more messages 320, and the end of logical RFT frame 310 may include frame check sequence 339. Frame check sequence 339 may be calculated in a manner similar to or identical to how frame check sequences are normally calculated in standard Ethernet frames.

Frame header 312 may include a two-byte EtherType field, specifying a value that may be used by a device to identify a frame as either an RFT frame or a standard Ethernet frame. Frame header 312 may further include information used for flow control. In some examples, flow control may be performed using a credit allocation algorithm, where credits are granted to sending devices specifying the amount of data that a given sending device is allowed to send. In the example of FIG. 4B, credits may be granted, on a per-virtual channel basis, using the fields following the EtherType field within frame header 312.

Frame header 312 also includes a frame sequence number and an acknowledge sequence number. As described herein, a retransmission scheme, implemented using frame sequence numbers and acknowledge sequence numbers, may be used to ensure point-to-point reliability between two devices. When a sending device sends a frame to a receiving device, the sending device includes within frame header 312 a frame sequence number; when a receiving device receives a frame from a sending device, the receiving device extracts the frame sequence number and sends a responsive frame that may include the frame sequence number in the acknowledge sequence number field of frame header 312.

Logical RFT frame 310 also includes one or more messages 320, each including a message header and a message payload (e.g., message 320A includes message header 321A and message payload 322A, message 320B includes message header 321B and message payload 322B). Each of messages 320 may be variable length, as the length of each of messages 320 is specified within each of message headers 321. Each of message headers 321 may also include a type field and a field specifying the virtual channel associated with the message. Multiple messages 320 may be included within logical RFT frame 310, which may enable efficient transmission of small messages. For instance, if only one message were transmitted per frame, some frames that include short messages (e.g., addresses) might not efficiently utilize the minimum size of an Ethernet-compliant frame. Accordingly, in some examples, multiple messages may be included within logical RFT frame 310.

In some examples, packing logic included within host networking unit 18 may pack messages in the scheduler selection order. Further, a scheduler, also included within the host networking unit 18 may apply, prior to the packing logic, different rates to different virtual channels to control the bandwidth per virtual channel.

Figure 4C:
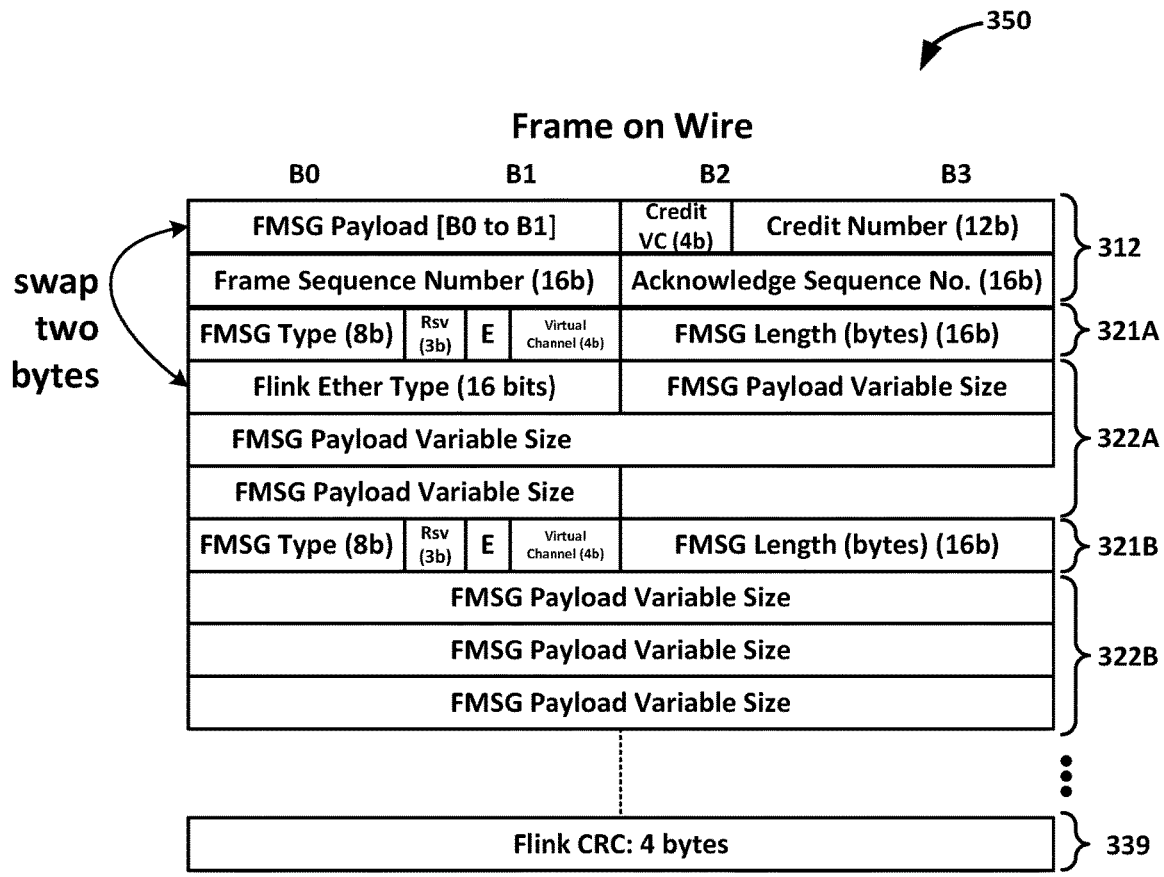
FIG. 4C is a conceptual diagram illustrating an example RFT frame, in accordance with one or more aspects of the present disclosure.

FIG. 4C is a conceptual diagram illustrating an example RFT frame, in accordance with one or more aspects of the present disclosure. FIG. 4C corresponds to the format of FIG. 4B, except that the two bytes at the beginning of the frame, which specify the EtherType of the frame, are swapped with the thirteenth and fourteenth bytes of the frame (the beginning of the fourth row). The format shown in FIG. 4C may be the format of the frame that is sent over the Ethernet physical connection. The swap ensures that the two bytes at the beginning of logical RFT frame 310 are, when received by an Ethernet frame parsing device as RFT frame 350, are located in the position that the Ethernet frame parser would expect to find the EtherType field.

When the frame of FIG. 4C is received by a device configured to parse Ethernet frames, such as one of host networking units 18 as illustrated in FIG. 2A, the device may check the frame for the value in the location of the frame where the EtherType is expected. Host networking unit 18 may use the value it finds in that location to determine whether the frame is an RFT frame (identified when a specific EtherType value is included within the field), or whether it is a standard Ethernet frame. If an RFT frame, RFT frame 350 may be parsed by host networking unit 18 in a manner consistent with the format illustrated in FIG. 4C. If an Ethernet frame, RFT frame 350 may be parsed by host networking unit 18 in a manner consistent with the format illustrated in FIG. 4A.

Figure 5:
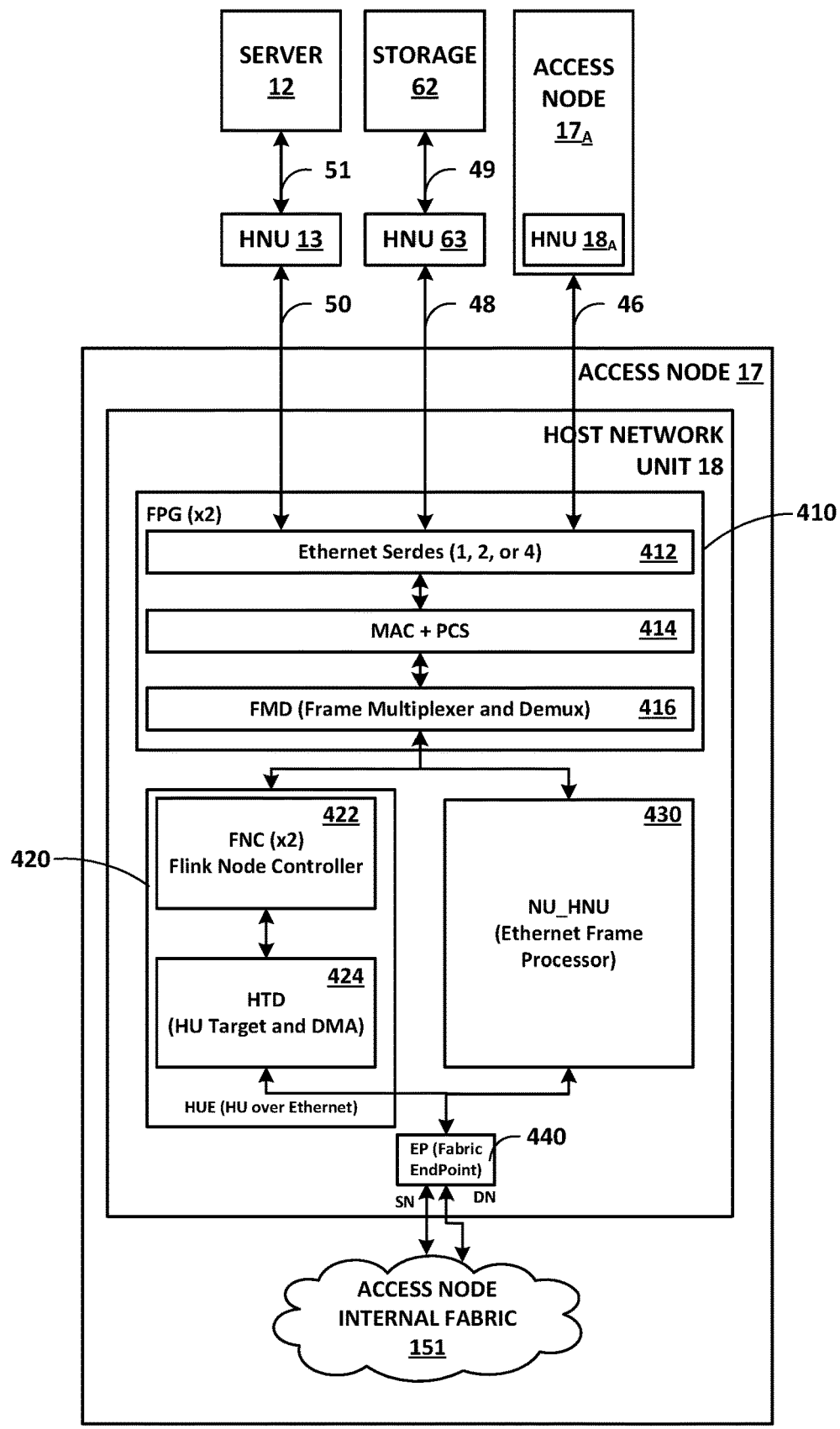
FIG. 5 is a conceptual diagram illustrating an example system in which an example access node is connected to multiple devices or systems, in accordance with one or more aspects of the present disclosure.

FIG. 5 is a conceptual diagram illustrating an example system in which an example access node is connected to multiple devices or systems, in accordance with one or more aspects of the present disclosure. In FIG. 5, access node 17 includes host networking unit 18 and internal fabric 151. Internal fabric 151 may correspond to the internal fabric illustrated within DPU 150 of FIG. 3. Host networking unit 18 includes fabric port group 410, RFT processing block 420, Ethernet frame processor 430, and fabric endpoint 440. Fabric port group 410 includes Ethernet serdes 412, MAC/PCS block 414, and frame multiplexer and demultiplexer (FMD) 416. RFT block 420 includes controller 422 and memory access block 424. Access node 17 is connected by Ethernet physical connection 50 to host networking unit 13, and host networking unit 13 is connected by PCIe link 51 to server 12. Access node 17 is connected by Ethernet physical connection 48 to host networking unit 63, and host networking unit 63 is connected by PCIe link 49 to storage device 62. Also, access node 17 is connected by Ethernet link 46 to access node 17A; access node 17A includes its own host networking unit 18A.

In the example of FIG. 5, host networking unit 18A may include components that correspond to those illustrated by host networking unit 18. Further, each of host networking units 13 and host networking units 63 may also be configured in a manner similar to host networking unit 18, since each of host networking units 13 and host networking units 63 are configured to generate and parse frames pursuant to the RFT protocol. Accordingly, each of host networking units 13 and host networking units 63, may include components corresponding to fabric port group 410, RFT block 420, Ethernet frame processor 430, and/or fabric endpoint 440. In addition, each of host networking units 13 and host networking units 63 may also include additional components that enable each of host networking units 13 and host networking units 63 to interface with servers 12 and storage device 62. Such components may include, for example, PCIe serdes devices and PCIe controllers.

In the example of FIG. 5, and in accordance with one or more aspects of the present disclosure, access node 17 may receive a frame generated by host networking unit 13. For instance, in the example of FIG. 5, server 12 identifies information to communicate to access node 17. Server 12 outputs, over PCIe link 51, a message including the information to communicate to access node 17. Host networking unit 13 receives the message, constructs a frame, and outputs the frame over Ethernet physical connection 50. Host networking unit 18 of access node 17 receives the frame.

Access node 17 may determine whether the frame is an RFT frame or an Ethernet frame. For instance, referring again to the example of FIG. 5, Ethernet serdes 412 of fabric port group 410 within host networking unit 18 receives the frame, processes the frame, and outputs it to MAC/PCS block 414. MAC/PCS block 414 further processes the frame, such as by performing media access control and/or physical coding sublayer operations. In some examples, MAC/PCS block 414 may evaluate a frame check sequence to determine whether there are any errors in the frame. If so, the frame may be dropped. MAC/PCS block 414 outputs the frame to frame multiplexer and demultiplexer (FMD) 416. FMD 416 analyzes the frame to determine whether the frame is an RFT frame or an Ethernet frame. To make this determination, FMD 416 may evaluate whether the data stored in the expected location of the EtherType field of the frame identifies the frame as an RFT frame. If the EtherType field does not identify the frame as an RFT frame, FMD 416 outputs the frame to Ethernet frame processor 430, which processes the frame as a conventional Ethernet frame. If the EtherType field does identify the frame as an RFT frame, FMD 416 outputs the frame to RFT block 420.

For an RFT frame, RFT block 420 processes the frame and performs operations based on the parsed data. For instance, in the example of FIG. 5, RFT block 420 identifies, based on data included within the frame, a sequence number associated with the frame. RFT block 420 may generate a responsive frame to acknowledge the received frame by including, within the responsive frame, the identified sequence number within the acknowledge sequence number field within frame header 312. RFT block 420 may also adjust, based on flow control information included within the frame (e.g., credit numbers within frame header 312), flow control parameters that may affect the rate and/or amount of data that may be sent in response to host networking unit 13 and/or over the identified virtual channel. RFT block 420 may identify data included within one or more messages 320, and communicate that data over fabric endpoint 440 to internal fabric 151 for processing by access node 17 or other devices.

In the example of FIG. 5, and in accordance with one or more aspects of the present disclosure, access node 17 may generate a frame to be sent to host networking unit 63. For instance, in the example of FIG. 5, RFT block 420 identifies, based on information received from fabric endpoint 440, information intended for storage at storage device 62. RFT block 420 generates a frame having the form illustrated in FIG. 4C.

The frame generated by RFT block 420 may include frame header 312. For instance, with reference to FIG. 5 and FIG. 4C, RFT block 420 includes within the frame, at the location where an Ethernet parser would expect an EtherType field, data (e.g., a predefined code) that identifies the frame as an RFT frame. RFT block 420 also determines, based on the receiving device (e.g., host networking unit 63) and/or the information received from fabric endpoint 440, a virtual channel over which the information should be transmitted. RFT block 420 may also allocate credit to the virtual channel and/or the receiving device (host networking unit 63) by including, within the frame header, information identifying the virtual channel and information identifying how much, if any, credit is being allocated to the virtual channel and/or receiving device. RFT block 420 further includes a sequence number within the frame header, and may also include an acknowledge sequence number, if it has received any frames from host networking unit 63 that have not yet been acknowledged.

The frame generated by RFT block 420 may include one or more messages 320. For instance, with reference to FIG. 5 and FIG. 4C, RFT block 420 packages the information intended for storage device 62 into one or more messages 320 that include a message header and a message payload corresponding to the format illustrated by RFT frame 350 of FIG. 4C. In some examples, each of messages 320 may be associated with a different virtual channel, with each of message headers 321 specifying the appropriate virtual channel for each message. In some implementations, messages may be buffered on a virtual channel basis, which may be helpful or necessary for avoiding deadlocks in some situations.

RFT block 420 outputs the frame to fabric port group 410. FMD 416 within fabric port group 410 identifies the frame as an RFT frame, and may demultiplex one or more messages into different virtual channels. FMD 416 passes the frame to MAC/PCS block 414 and Ethernet serdes 412 for further processing. Fabric port group 410 outputs the frame to host networking unit 63. Host networking unit 63 processes the frame in a manner consistent with the earlier description, provided above, relating to the processing of the frame received from server 12 through host networking unit 13.

In some examples, RFT and Ethernet frames may coexist. For instance, in the example of FIG. 5, host networking unit 18 may process both RFT frames and Ethernet frames, and may process both types of frames simultaneously, concurrently, and/or alternately. Further, host networking unit 18 may interleave RFT and Ethernet frames on any appropriate basis. In some examples, fabric port group 410 may allocate bandwidth between RFT frames processed by RFT block 420 and conventional frames processed by Ethernet frame processor 430 on a weighted round robin basis, where a weight value shapes the amount of traffic that RFT block 420 and Ethernet frame processor 430 may be allocated.

In some examples, FMD 416 may multiplex Ethernet and RFT frames at packet boundaries. Further, FMD 416 may configure a guaranteed rate for each traffic type (RFT and Ethernet) and distribute any excess bandwidth using a deficit weighted round-robin scheme. In such an example, FMD 416 may, at the time of arbitration, treat bandwidth requests as high-priority requests if the request is associated with a traffic type (or device and/or channel) that has guaranteed rate credits available. Otherwise, such requests may be treated as a low-priority requests. FMD 416 may arbitrate among high-priority requestors (if there is more than one) in a round-robin fashion. If FMD 416 determines, as a guaranteed rate arbiter, that a grant will not be generated (e.g., because no requests are under the guaranteed rate), FMD 416 may employ a deficit weighted round-robin arbitration scheme that performs a weighted round-robin allocation taking into account the packet length.

Once an allocation is granted in response to a request (e.g., granted to either Ethernet frames or RFT frames), FMD 416 enables the entire packet associated with the allocated type to be transmitted before arbitrating again. If FMD 416 generated the grant based on a guaranteed rate arbitration procedure, the guaranteed rate credit counter is charged for the packet (which, in some examples, may cause the counter to be negative). Otherwise FMD 416, as the deficit weight round-robin arbitrator, may be charged for the packet.

Figure 6:
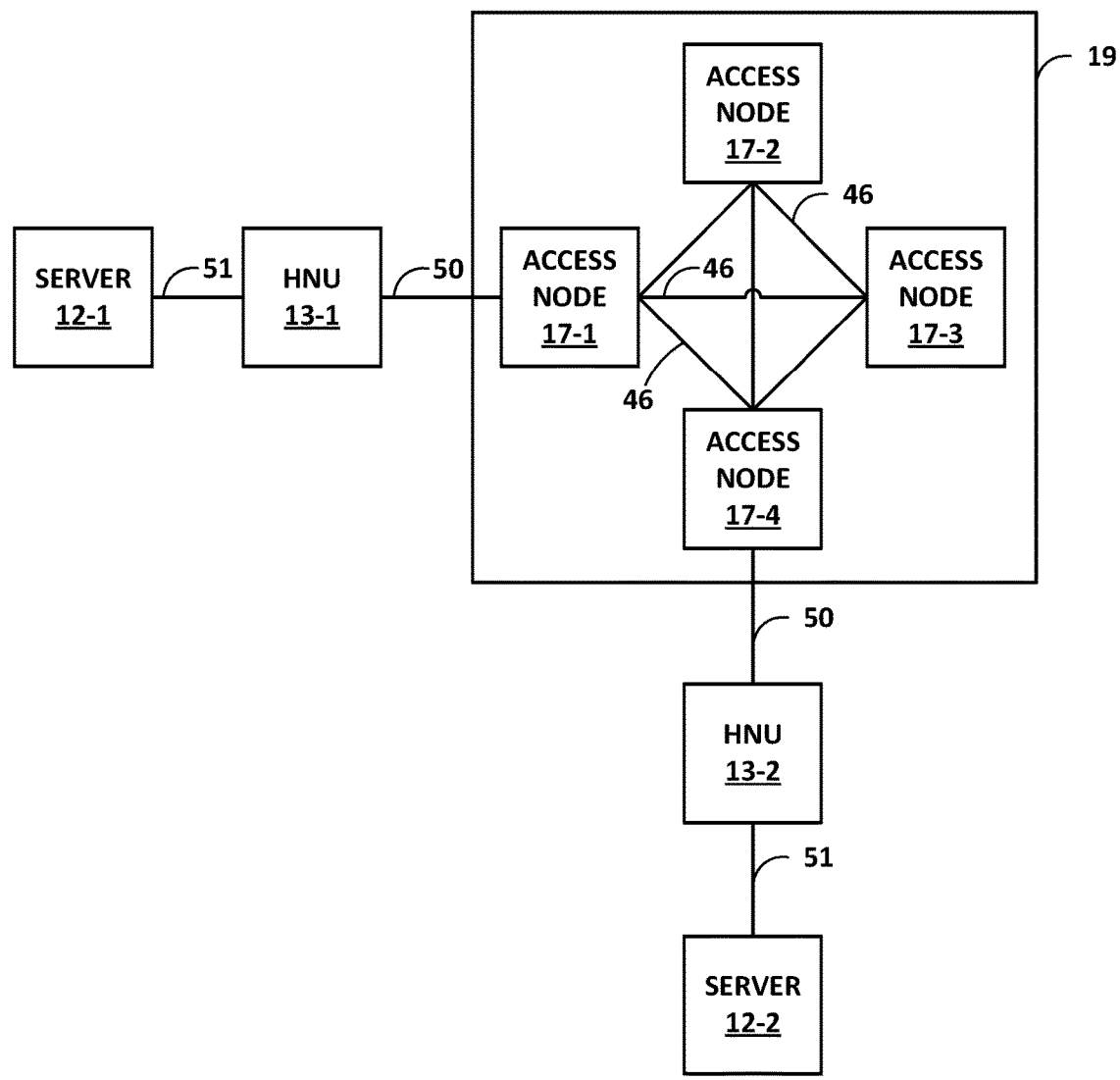
FIG. 6 is a conceptual diagram illustrating an example system in which two servers may communicate over a path having multiple access nodes pursuant to the RFT protocol, in accordance with one or more aspects of the present disclosure.

FIG. 6 is a conceptual diagram illustrating an example system in which two servers may communicate over a path having multiple access nodes pursuant to the RFT protocol, in accordance with one or more aspects of the present disclosure. The example of FIG. 6 illustrates access node group 19 including four access nodes 17. Connected to access nodes 17 of access node group 19 may be various servers 12. As illustrated in FIG. 6, server 12-1 is connected to access node 17-1 through host networking unit 13-1. Server 12-2 is connected to access node 17-2 through host networking unit 13-2.

In the example of FIG. 6, and in accordance with one or more aspects of the present disclosure, server 12-2 may communicate with server 12-1 using RFT protocol. For instance, in the example of FIG. 6, server 12-2 identifies information to be communicated to server 12-1. Server 12-2 outputs the information over PCIe link 51 to host networking unit 13-2 in a PCIe message. Host networking unit 13-2 receives the information, and outputs the information over Ethernet physical connection 50 to access node 17-4 within an RFT frame. Access node 17-4 receives the information within an RFT frame, and outputs the information over Ethernet link 46 to access node 17-1 in an Ethernet frame. Access node 17-1 receives the information within the Ethernet frame, and outputs the information over Ethernet physical connection 50 to host networking unit 13-1 within an RFT frame. Host networking unit 13-1 receives the information within the RFT frame, and outputs the information over PCIe link 51 to server 12-1 in a PCIe message.

Host networking unit 13-1 may acknowledge receipt of the RFT frame sent by host networking unit 13-2 through access node 17-1 and access node 17-2. For instance, in the example of FIG. 6, after host networking unit 13-2 receives the information within the RFT frame from access node 17-1, host networking unit 13-2 generates a responsive frame that includes an acknowledgement of the frame originally sent by host networking unit 13-2. Host networking unit 13-2 outputs the responsive RFT frame over Ethernet physical connection 50 to access node 17-1, which then communicates the acknowledgment included within the RFT frame to access node 17-4. Access node 17-4 sends an RFT frame including the acknowledgement over Ethernet physical connection 50 to host networking unit 13-2. Host networking unit 13-2 receives the RFT frame, parses the frame, and determines that the original frame sent by host networking unit 13-2 has been acknowledged.

Accordingly, the endpoints for an RFT connection might not be adjacent nodes with a direct connection. Further, the endpoints for an RFT connection might not need to be near each other, since a portion of the path between the endpoints might be carried over Ethernet by intervening devices. In some examples, a virtual point to point connection can be constructed over intervening access nodes 17, and only one acknowledgement of the original RFT frame needs to be sent (by host networking unit 13-1 to host networking unit 13-2), without intervening acknowledgments sent between each hop in the path. By communicating over such a virtual point to point connection in this way, significant efficiencies can be achieved by avoiding the additional acknowledgements that might otherwise be required between multiple intervening devices.

Figure 7:
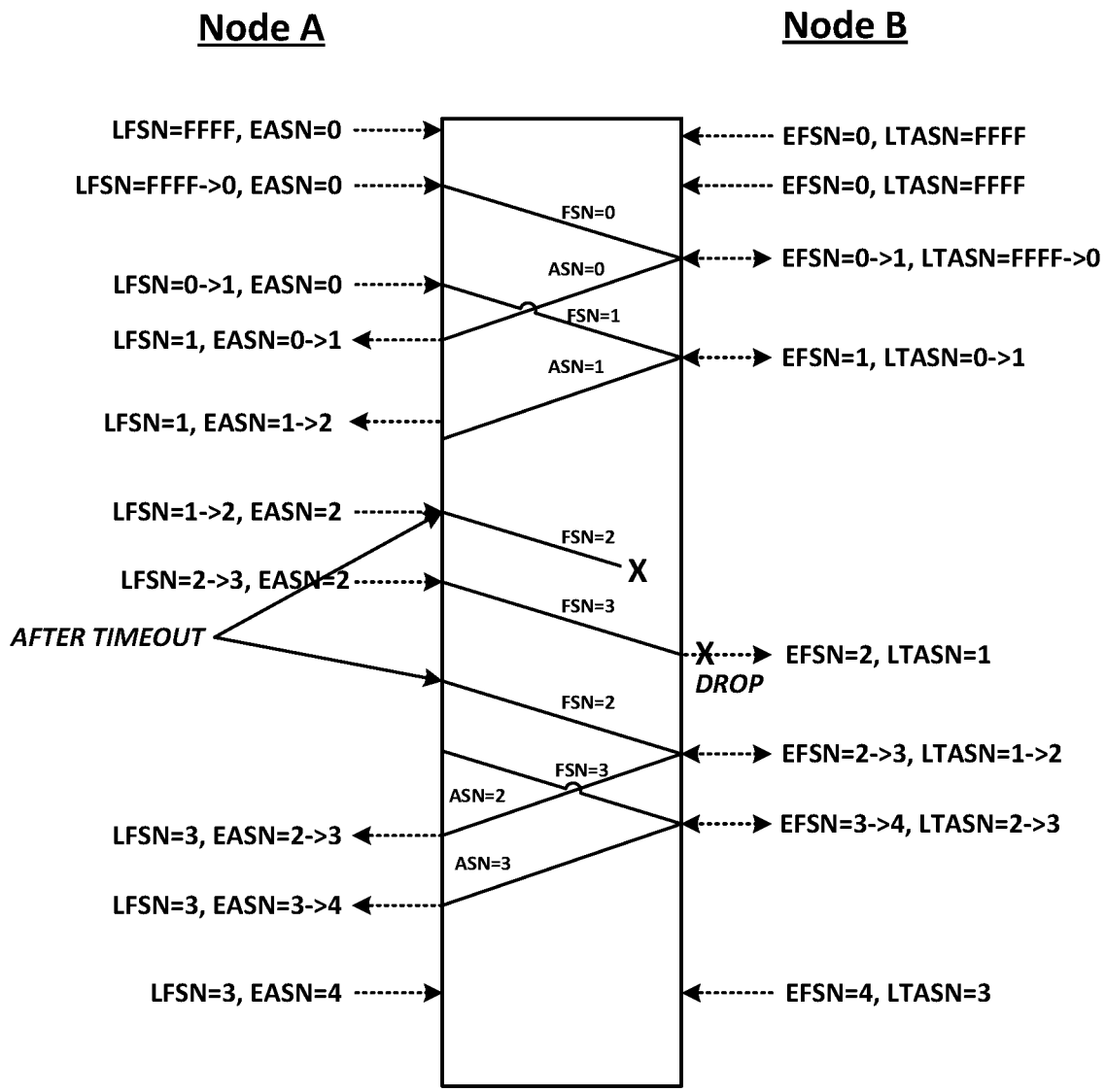
FIG. 7 is a diagram illustrating handling of frame sequence numbers between two nodes communicating pursuant to RFT protocol, in accordance with one or more aspects of the present disclosure.

FIG. 7 is a diagram illustrating handling of frame sequence numbers between two nodes communicating pursuant to RFT protocol. Each of the nodes may be capable of communicating through both Ethernet and RFT protocol. When communicating through RFT protocol, each of the RFT frames communicated between the nodes may include multiple messages, as illustrated in FIG. 4B.

In the example of FIG. 7, and upon power up or during an initial state, each of Nodes A and B start in a standard Ethernet mode. Thereafter, transmission of RFT frames is disabled until enabled (e.g., enabled by software executing on each of Nodes A and B). Each of Nodes A and B should drop any RFT frames received if RFT mode is not enabled. Once the Ethernet physical layer is established between Node A and Node B, software at both nodes should cause each node to exchange parameters to enable RFT protocol. Software executing at both Nodes A and B can establish a reliable channel using Ethernet (TCP over IP) or other methods. In some examples, software executing on Nodes A and B is capable of resetting or establishing each port associated with a respective node without RFT or Ethernet frame loss. Any RFT frames lost during reset, initial configuration, or reconfiguration might be recovered through retransmissions.

In FIG. 7, Nodes A and B have established and enabled RFT communications, and Node A (on the left hand side of the diagram) is transmitting RFT frames to the Node B (on the right hand side of the diagram). As illustrated in FIG. 4C, each RFT frame may include two sequence numbers: a frame sequence number and an acknowledge sequence number. In some examples, each node maintains at least two items of data associated with frame sequence numbers. One item of data indicates the last frame sequence number that was transmitted (Last Frame Sequence Number, or "LFSN" in the diagram), which corresponds to the frame sequence number included in the most recent transmission of a frame from the node. A second item of data indicates the next sequence number expected to be acknowledged (Expected Acknowledge Sequence Number, or "EASN" in the diagram). In the example of FIG. 7, if an RFT frame transmitted by Node A is not acknowledged in a programmed amount of time, Node A retransmits all of the frames not yet acknowledged.

In the diagram of FIG. 7, an in accordance with one or more aspects of the present disclosure, Node A transmits RFT frames and recovers from failed transmissions. For instance, in the example of FIG. 7, LFSN is initialized with a value of "FFFF." Node A begins by transmitting a frame with sequence number 0 ("FSN=0"), which is acknowledged by Node B. Node A continues transmitting frames, and each time, increments the frame sequence number included within the frame. When Node A transmits the frame with sequence number 2 followed by a frame with sequence number 3, a timeout occurs before Node A receives an acknowledgement for the frame with sequence number 2. Node A retransmits both the frame having the sequence number 2 and the frame having the sequence number 3. Node B receives the retransmitted frames, and Node A receives an acknowledgement from Node B.

In the example illustrated, Node B acknowledges each of the frames sent by Node A. In other examples, some efficiencies may be gained by Node B acknowledging only the most recent frame (or one of the recent frames) received by Node B. For instance, if Node A receives an acknowledgment of frame 3, for example, without receiving an acknowledgment of one or more earlier frames, Node A may, in some examples, assume that frame 3 and all earlier frames were successfully received. In other words, Node A may treat an acknowledgment of frame 3 as an acknowledgment of all frames with sequence numbers less than or equal to 3.

In some examples, Node A may mark a transmitted frame with an error if an error is detected at the end of the message. Node A may pack multiple messages (messages 320 in FIG. 4B) in a frame without storing the full message, which may reduce the time that Node A spends generating a frame. For the first transmission of a frame, if Node A detects an error towards the tail (or middle) of the message 320, Node A will communicate the error by poisoning the CRC (e.g., frame check sequence 339 of FIG. 4B) of the frame. Node B may discard the whole frame (and all messages in the frame).

During frame retransmission, logic within Node A may, in some examples, promote the error to a message header 321 (e.g., see the "E" bit within message header 321A of FIG. 4B) and not mark the retransmitted frame with an error (e.g., Node A does not poison the CRC of the frame). In such an example, Node B may receive other non-error messages in the frame and with only one of the messages marked with an error. Hence RFT protocol allows packing error messages with non-error messages. Those messages not marked as errors should have valid types, virtual channels, and messages. Node B may process those messages accordingly (e.g., by forwarding to memory access block 424).

Figure 8:
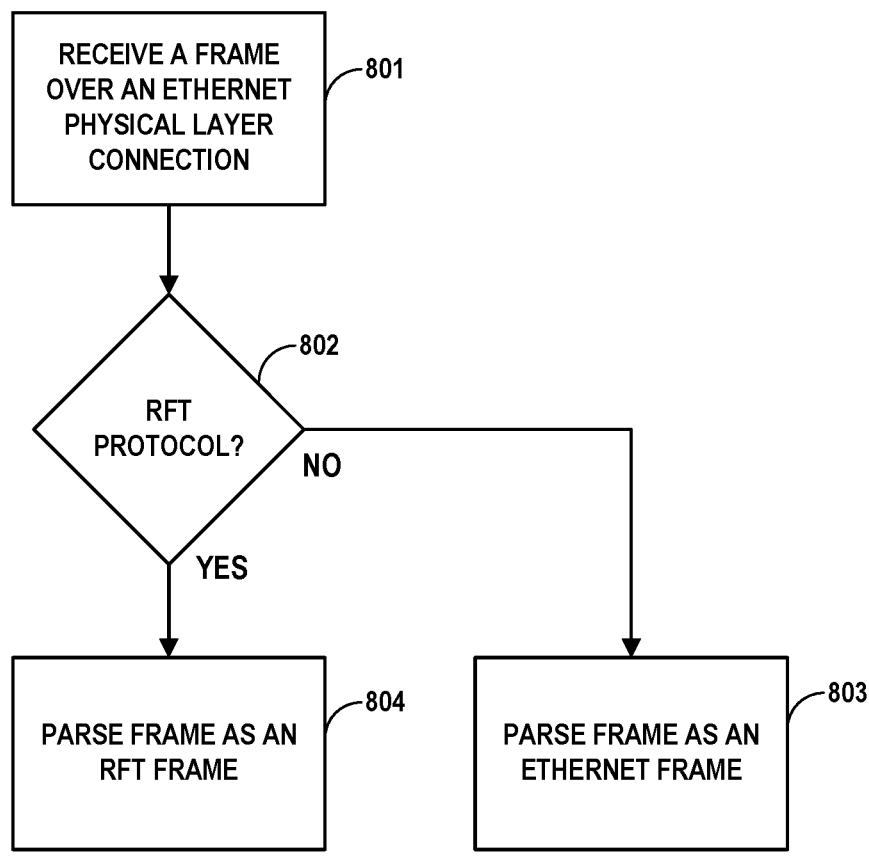
FIG. 8 is a flow diagram illustrating an example process for processing a frame received over an Ethernet physical connection in accordance with one or more aspects of the present disclosure.

FIG. 8 is a flow diagram illustrating an example process for processing a frame received over an Ethernet physical connection in accordance with one or more aspects of the present disclosure. In the example of FIG. 8, the illustrated process may be performed by host networking unit 18 in the context illustrated in FIG. 5. In other examples, different operations may be performed, or operations described in connection with FIG. 8 may be performed by one or more other components, modules, systems, and/or devices. Further, in other examples, operations described in connection with FIG. 8 may be merged, performed in a difference sequence, omitted, or may encompass additional operations not specifically illustrated or described.

In the example of FIG. 8, and in accordance with one or more aspects of the present disclosure, host networking unit 18 may receive a frame over an ethernet physical layer connection (801). For instance, in some examples, and with reference to FIG. 5, fabric port group 410 of host networking unit 18 may receive a frame over Ethernet physical connection 50 from host networking unit 13. The frame may include information that server 12 seeks to send to access node 17 or across internal fabric 151 included within access node 17.

Host networking unit 18 may determine whether the frame is an Ethernet frame or an RFT protocol frame (802). For instance, in the example of FIG. 5, FMD 416 parses the value of the two bytes that immediately follow the twelve-byte sequence where the destination and source address fields would be expected to be located within an Ethernet frame. FMD 416 determines whether the value of those two bytes corresponds to a value that indicates that the frame is to be interpreted as an RFT frame.

If host networking unit 18 determines that the value does not indicate that the frame is to be interpreted as an RFT frame, host networking unit 18 may parse the frame as a standard Ethernet frame (803). For instance, with reference to FIG. 5, FMD 416 outputs the frame to Ethernet frame processor 430. Ethernet frame processor 430 processes the frame as a standard Ethernet frame. Ethernet frame processor 430 outputs information about the frame to fabric endpoint 440 and across internal fabric 151.

If host networking unit 18 determines that the value does indicate that the frame is to be interpreted as an RFT frame, host networking unit 18 may parse the frame as an RFT frame (804). For instance, with reference to FIG. 5, FMD 416 outputs the frame to RFT block 420. RFT block 420 processes the frame as an RFT frame. RFT block 420 sends, within an RFT frame, an acknowledgement of the frame back to host networking unit 13. RFT block 420 outputs information about the frame to fabric endpoint 440 and across internal fabric 151.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices (e.g., servers 12, access nodes 17, storage devices 62, host networking units 13, host networking units 18, host networking units 63, as well as others) are shown within the Figures and/or in other illustrations referenced herein. However, techniques in accordance with one or more aspects of the present disclosure may be performed with many more of such systems, and collective references to components, devices, modules, and/or systems may represent any number of such components, devices, modules, and/or systems.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A network system comprising:
   a source device;
   an Ethernet physical layer connection; and
   a destination device connected to a destination host device, wherein the destination device is connected to the source device over the Ethernet physical layer connection, and
   wherein the destination device is configured to:
   receive a frame over the Ethernet physical layer connection from the source device by receiving, in order, an Ethernet preamble, an Ethernet start frame delimiter, a twelve-byte field, a two-byte type field, a data field, and a four-byte Ethernet frame check sequence calculated based on the frame, determine, based on the two-byte type field, that the frame is not to be interpreted as an Ethernet frame,
   parse, from the twelve-byte field included within the frame, a frame sequence number, and
   parse, from the twelve-byte field, an acknowledge sequence number and bandwidth allocation information,
   wherein the bandwidth allocation information identifies a virtual channel and a credit number associated with the virtual channel.

2. The network system of claim 1,
   wherein the destination device allocates a plurality of virtual channels for sending information to the source device, and wherein the destination device adjusts, based on the credit number, how much information is sent over the virtual channel.

3. The network system of claim 1, wherein at least one of the source device and the destination device is configured to:
   allocate bandwidth between Ethernet frames and frames that are not to be interpreted as Ethernet frames.

4. The system of claim 1, wherein the destination device is further configured to:
   parse, from the data field, a plurality of messages from the frame, wherein each of the plurality of messages includes a message header and a message payload.

5. The system of claim 4, wherein each of the message headers includes information identifying a message type, a virtual channel, and a length.

6. The system of claim 4, wherein the plurality of messages includes:
   a first message including an eight-byte address; and
   a second message including data associated with the address.

7. The system of claim 6, wherein the data associated with the address is 64 bytes.

8. The system of claim 5, wherein at least some of the plurality of messages are associated with a different virtual channel.

9. The system of claim 5, wherein the destination device is further configured to:
   determine a rate for at least one identified virtual channel; and
   control the bandwidth for the identified virtual channel.

10. The system of claim 4, wherein at least one of the plurality of messages is marked with an error, wherein a subset of the plurality of messages are not marked with an error, and wherein the destination device is further configured to:
    process only the subset of the plurality of messages.

11. The system of claim 1, wherein the destination device is further configured to:
    prior to receiving the frame, establish communications with the sending device over the Ethernet physical layer.

* * * * *

UNITED STATES PATENT AND TRADEMARK OFFICE
CERTIFICATE OF CORRECTION

PATENT NO. : 10,798,223 B2  
APPLICATION NO. : 16/295902  
DATED : October 6, 2020  
INVENTOR(S) : Pradeep Sindhu et al.

Page 1 of 1

It is certified that error appears in the above-identified patent and that said Letters Patent is hereby corrected as shown below:

In the Claims

Column 22, Line 3-4 (Claim 1): Replace:
"based on the frame, determine , based on the two-byte type"
With:
--based on the frame,
    determine, based on the two-byte type--

Signed and Sealed this
Thirty-first Day of May, 2022

Katherine Kelly Vidal
*Director of the United States Patent and Trademark Office*